Nov. 29, 1955  G. R. WILSON ET AL  2,725,509
CONTROL SYSTEMS FOR DYNAMO ELECTRIC MACHINES
Filed Sept. 30, 1952
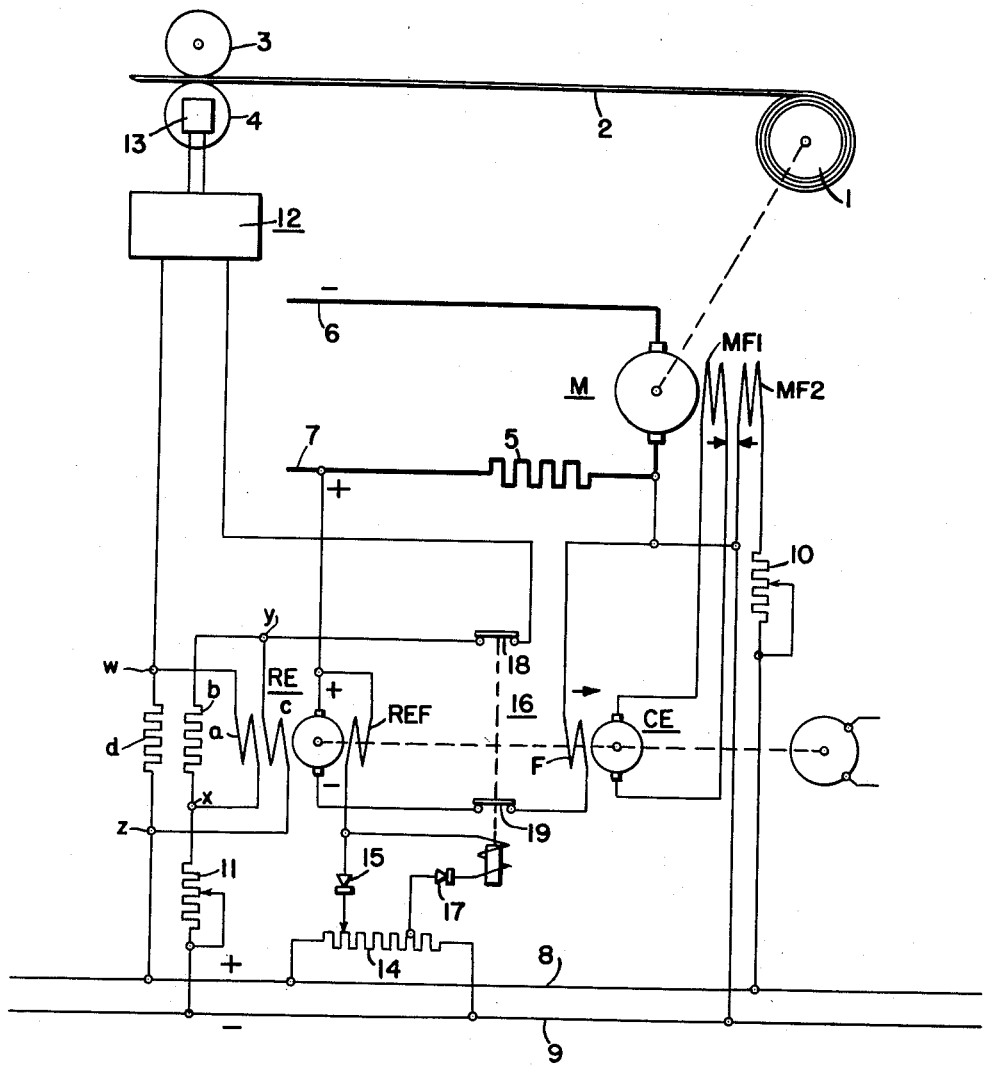
WITNESSES:
E. A. McCloskey.
Leon M. Garman.
INVENTORS
Graham R. Wilson
and Allan Asbury.
BY Paul E. Friedemann
ATTORNEY United States Patent Office 2,725,509
Patented Nov. 29, 1955

2,725,509

CONTROL SYSTEMS FOR DYNAMO ELECTRIC MACHINES

Graham Rudge Wilson and Allan Asbury, Stafford, England, assignors to The English Electric Company Limited, London, England, a company of Great Britain Application September 30, 1952, Serial No. 312,378

Claims priority, application Great Britain October 5, 1951

6 Claims. (Cl. 318—6)

This invention relates to electric control systems for a direct current dynamo electric machine adapted to be operatively coupled to a tension-producing roll or drum forming part of a strip rolling mill. The machine may, for example, be coupled to a strip coiler or de-coiler or, where the coiler is associated with a tension-producing stand, to the stand itself, or it may be coupled to one of the stands of a two-stand temper mill. In the case of a reversing mill the machine will, of course, operate alternately as a motor pulling the strip through the mill and as a generator exerting a braking force whereby to retard the passage of the strip through the mill.

The invention is concerned with systems of the kind including an automatic tension regulator responsive to a function varying with strip tension and which is effective to control the torque of the machine in a sense tending to maintain the tension substantially constant. Such a system will hereinafter be referred to as an electric control system of the kind set forth.

According to the invention in an electric control system of the kind set forth, means responsive to variation of the roll force on the associated mill stand are arranged to provide an additional automatic control of torque which operates in a sense to assist the automatic control dependent on strip tension.

The means responsive to variations of roll force may be arranged to control a further automatic tension control regulator or, alternatively, a single regulator may be arranged to respond both to a function dependent on strip tension and to a function dependent on roll force. The function dependent on strip tension may be arranged to vary, for example, in accordance with the deflection of a strip engaging member or in accordance with the armature current of the machine.

Preferably the automatic tension control regulator comprises an amplifying device arranged to control the torque of the machine and in such an arrangement the amplifying device may be controlled in accordance with the difference between a voltage dependent on the armature current of the machine and a voltage derived from a further amplifying device, the further amplifying device being controlled in accordance with an adjustable reference voltage and a voltage varying with variations of roll force. Means may also be included for limiting the maximum torque which the system can tend to maintain.

Other features of the invention will appear from the following description with reference to the accompanying drawing where there is shown the simplified circuit diagram of a strip coiler embodying the invention.

Referring now to the drawing, the reel 1, on which the strip 2 is coiled as it issues from the reducing rolls 3 and 4 of the mill, is driven by a direct current motor M, the armature of which is supplied through a current measuring resistor 5 from the bus bars 6 and 7, the voltage of the bus bars being made variable in known manner to vary simultaneously the speed of both the mill and the reel 1. The motor is provided with separately excited field windings MF1 and MF2. Field winding MF1 is supplied from a control exciter CE whilst field winding MF2 is supplied from substantially constant voltage bus bars 8 and 9 through a rheostat 10. This rheostat, as will be explained later, determines the excitation of the motor during the "wrapping" process.

The field winding F of the control exciter CE is connected in series with the armature of a reference exciter RE across the resistor 5. Two field windings $a$ and $c$ are provided on this exciter RE. The field winding $a$ is connected across junctions $w$ and $x$, and the field winding $c$ is connected across junctions $y$ and $z$, thus forming two opposite legs of a bridge circuit. Resistors $b$ and $d$ are connected in the other pair of opposite legs of the bridge circuit, i. e. resistor $b$ is connected across junctions $x$ and $y$ and resistor $d$ is connected across junctions $w$ and $z$.

Junctions $x$ and $z$ of the bridge circuit are supplied with a selected constant potential from bus bars 8 and 9 through the tension-setting rheostat 11, and junctions $w$ and $y$ are supplied with potential from the output of the electronic amplifier 12. This amplifier is controlled by pressure sensitive resistance strain gauges 13 positioned under the screw rolls and is arranged to provide an output voltage dependent on the difference between a reference voltage and a voltage dependent on the roll force and which changes in polarity with changes in the sense of the difference.

The field winding REF of the reference exciter functions as a limiting winding which, under certain conditions, limits the output of the exciter. For this purpose it is connected in circuit with a rheostat 14, supplied from the bus bars 8 and 9, and connected in circuit with a blocking rectifier 15. The polarity of the voltage across the rheostat 14 and the disposition of the blocking rectifier 15 is such that the winding is only excited if the voltage drop across the resistor 5 exceeds the voltage tapped off the rheostat. A relay 16 is connected in circuit with a further blocking rectifier 17, and part of the rheostat 14, across the resistor 5.

During wrapping, the armature current of the motor, and thus the voltage drop across the resistor 5, is comparatively small. The relay 16 is connected to a point on the rheostat 14 such that, at this low armature current, the voltage tapped off from the rheostat exceeds the voltage drop across the resistor 5 so that the rectifier 17 allows current to flow through the relay 16. During wrappings, therefore, this relay is energized and maintains its normally closed contacts 18 and 19 open so as to disconnect the amplifier 12 from the field windings $a$ and $c$ and to maintain the field winding F of the exciter CE de-energized. The excitation of the motor M is thus, under these conditions, dependent solely on the field winding MF2. This excitation is, of course, determined by the rheostat 10.

When the strip 2 pulls tight at the end of the wrapping operation, the coiler motor slows down and its armature current increases. The voltage drop across the resistor 5 therefore increases and, as a result, the current through the relay 16 falls and at a predetermined value of current the relay contacts 18 and 19 close to connect the amplifier 12 to the field windings $a$ and $c$ and the field winding F to the reference exciter RE respectively. This brings the automatic control into operation and the excitation of the motor M will now be varied automatically in accordance with both the armature current of the motor and the roll force.

Considering first the control dependent on motor armature current, assuming the control dependent on roll force to be inoperative; the reference exciter RE operates on substantially constant excitation, as determined by the rheostat 11, and therefore generates a substantially constant output voltage. The polarity of the exciter is such that this voltage opposes the voltage drop across the resistor 5 so that the field winding F of the control exciter CE will be energized in accordance with the difference of the two voltages. The field winding MF1 of the motor M will accordingly be excited, thereby tending to increase the armature current of the motor and a condition of equilibrium will be reached when the armature current produces a voltage drop across the resistor 5 such that the out-of-balance voltage applied to the control exciter CE provides the necessary motor excitation to maintain this current. Any variation in armature current as the coil builds up on the reel will thereafter result in an automatic variation of motor excitation in a corrective sense and the motor horsepower, and thus the strip tension, will be maintained substantially constant.

Considering now the modifying action of the roll force control; if for any reason the roll force varies, for example due to a slight increase in the thickness of the strip entering the rolls 3 and 4 or to an increase of friction between the rolls and the strip, the roll force will increase and the output from the amplifier 12 will accordingly increase. The excitation of the reference exciter will accordingly be increased and the net voltage applied to the field winding F of the control exciter CE will be reduced. This will result in an automatic increase of armature current in the motor M whereby the pull on the strip will be increased, and thus the roll force decreased. The converse will, of course, take place if the roll force decreases for any reason.

It will thus be seen that the roll force control exercises a trimming influence on the armature current control in a sense to increase the accuracy of the strip gauge. If for any reason the roll force control should fail, the system will still operate on the armature load current control and the normal automatic control of tension will still be maintained.

The field winding REF of the reference exciter RE is maintained de-energized by the blocking rectifier 15 so long as the armature current of the motor M does not exceed a predetermined value. If, however, for any reason the armature current should tend to become excessive, the voltage drop across the resistor 5 will exceed the voltage tapped off the rheostat 14 through the rectifier 15 and a current will flow through the field winding REF. This winding is arranged so that when energized it opposes the field windings a and c and prevents the exciter output, and thus the strip tension, from increasing above a predetermined value. This value is determined by the setting of the slider on the rheostat 14 which will be set by the operator in accordance with the maximum permitted tension in the strip being rolled. The rheostat may in some cases be ganged with the main tension setting rheostat 11, thereby reducing the number of operators' controls.

It will be appreciated that, whilst in the specific embodiment a coiler drive is illustrated, the invention may equally well be applied to decoiler drives. In either case the roll force sensitive device may be arranged to control all tension regulating devices on either, or both, sides of the mill.

What we claim as our invention and desire to secure by Letters Patent is:

1. In a system of control for an electric motor driving a wind-up roll for a strip of material passing through pressure rolls of a mill, in combination, a motor having an armature circuit supplied with electric energy from suitably energized terminals, said armature circuit including an impedance and the armature winding of the motor, a field winding circuit for the motor connected to suitable constant potential terminals, said field winding circuit including a field winding and a rheostat, a second field winding for the motor, and control means for energizing the second field winding, said control means including a control exciter connected in a loop circuit with said second field winding, a control field for the control exciter, a reference exciter connected in a loop circuit with said impedance and the control field of the control exciter, and means for exciting the reference exciter, whereby the control exciter is excited as a function of the output of the reference exciter and the voltage drop across said impedance.

2. In a system of control for an electric motor driving a wind-up roll for a strip of material passing through pressure rolls of a mill, in combination, a motor having an armature circuit supplied with electric energy from suitably energized terminals, said armature circuit including an impedance and the armature winding of the motor, a field winding circuit for the motor connected to suitable constant potential terminals, said field winding circuit including a field winding and a rheostat, a second field winding for the motor, and control means for energizing the second field winding, said control means including a control exciter connected in a loop circuit with said second field winding, a control field for the control exciter, a reference exciter connected in a loop circuit with said impedance and the control field of the control exciter, field windings for the reference exciter, said field windings being energized as a function of a reference voltage and a voltage output that varies from a norm either increasing or decreasing depending on the rise or fall of the pressure exerted on the strip of material by said pressure rolls.

3. In a system of control for an electric motor driving a wind-up roll for a strip of material passing through pressure rolls of a mill, in combination, a motor having an armature circuit supplied with electric energy from suitably energized terminals, said armature circuit including an impedance and the armature winding of the motor, a field winding circuit for the motor connected to suitable constant potential terminals, said field winding circuit including a field winding and a rheostat, a second field winding for the motor, and control means for energizing the second field winding, said control means including a control exciter connected in a loop circuit with said second field winding, a control field for the control exciter, a reference exciter connected in a loop circuit with said impedance and the control field of the control exciter, a bridge circuit having opposite junctions connected to a suitable source of voltage of a selectable constant value and having a second pair of opposite junctions energized as a function of the pressure of the pressure rolls on the strip of material, a field winding for the reference exciter connected in one leg of the bridge circuit, a second field winding connected in the opposite leg of the bridge circuit, a resistor in the third leg of the bridge circuit and a second resistor in the fourth leg of the bridge circuit.

4. In a system of control for an electric motor driving a wind-up roll for a strip of material passing through pressure rolls of a mill, in combination, a motor having an armature circuit supplied with electric energy from suitably energized terminals, said armature circuit including an impedance and the armature winding of the motor, a field winding circuit for the motor connected to suitable constant potential terminals, said field winding circuit including a field winding and a rheostat, a second field winding for the motor, and control means for energizing the second field winding, said control means including a control exciter connected in a loop circuit with said second field winding, a control field for the control exciter, a reference exciter connected in a loop circuit with said impedance and the control field of the control exciter, a bridge circuit having opposite junctions connected to a suitable source of voltage of a selectable constant value and having a second pair of opposite junctions energized as a function of the pressure of the pressure rolls on the strip of material, a field winding for the reference exciter connected in one leg of the bridge circuit, a second field winding connected in the opposite leg of the bridge circuit, a resistor in the third leg of the bridge circuit and a second resistor in the fourth leg of the bridge circuit, and means responsive to a selected voltage difference between the voltage of the reference exciter and a reference voltage for disconnecting the voltage source from the second pair of opposite junctions of the bridge circuit.

5. In a system of control for an electric motor driving a wind-up roll for a strip of material passing through pressure rolls of a mill, in combination, a motor having an armature circuit supplied with electric energy from suitably energized terminals, said armature circuit including an impedance and the armature winding of the motor, a field winding circuit for the motor connected to suitable constant potential terminals, said field winding circuit including a field winding and a rheostat, a second field winding for the motor, and control means for energizing the second field winding, said control means including a control exciter connected in a loop circuit with said second field winding, a control field for the control exciter, a reference exciter connected in a loop circuit with said impedance and the control field of the control exciter, a bridge circuit having opposite junctions connected to a suitable source of voltage of a selectable constant value and having a second pair of opposite junctions energized as a function of the pressure of the pressure rolls on the strip of material, a field winding for the reference exciter connected in one leg of the bridge circuit, a second field winding connected in the opposite leg of the bridge circuit, a resistor in the third leg of the bridge circuit and a second resistor in the fourth leg of the bridge circuit, a third field winding for the reference exciter responsive to a predetermined rise in motor armature current to oppose the excitation effects of the other field windings of the reference exciter to thus prevent the strip tension from rising above a selected value.

6. In a system of control for an electric motor driving a wind-up roll for a strip of material passing through pressure rolls of a mill, in combination, a motor having an armature circuit supplied with electric energy from suitably energized terminals, said armature circuit including an impedance and the armature winding of the motor, a field winding circuit for the motor connected to suitable constant potential terminals, said field winding circuit including a field winding and a rheostat, a second field winding for the motor, and control means for energizing the second field winding, said control means including a control exciter connected in a loop circuit with said second field winding, a control field for the control exciter, a reference exciter connected in a loop circuit with said impedance and the control field of the control exciter, a bridge circuit having opposite junctions connected to a suitable source of voltage of a selectable constant value and having a second pair of opposite junctions energized as a function of the pressure of the pressure rolls on the strip of material, a field winding for the reference exciter connected in one leg of the bridge circuit, a second field winding connected in the opposite leg of the bridge circuit, a resistor in the third leg of the bridge circuit and a second resistor in the fourth leg of the bridge circuit, and means responsive to a selected voltage difference between the voltage of the reference exciter and a reference voltage for disconnecting the voltage source from the second pair of opposite junctions of the bridge circuit, a third field winding for the reference exciter responsive to a predetermined rise in motor armature current to oppose the excitation effects of the other field windings of the reference exciter to thus prevent the strip tension from rising above a selected value.

References Cited in the file of this patent

UNITED STATES PATENTS

| | | |
|---|---|---|
| 2,447,654 | Kenyon | Aug. 24, 1948 |
| 2,466,716 | Lilja | Apr. 12, 1949 |
| 2,550,104 | Allbert | Apr. 24, 1951 |
| 2,601,527 | Hunt | June 24, 1952 |
| 2,634,386 | Pell | Apr. 7, 1953 |